March 11, 1941.  W. H. BENTZ  2,234,397
FILTERING DEVICE FOR THE PRODUCTION OF BEVERAGES, SUCH AS TEA AND COFFEE
Filed May 20, 1937  3 Sheets-Sheet 1
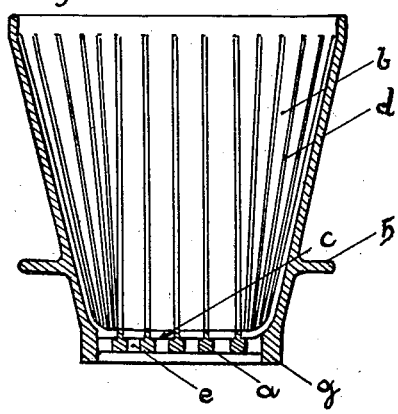
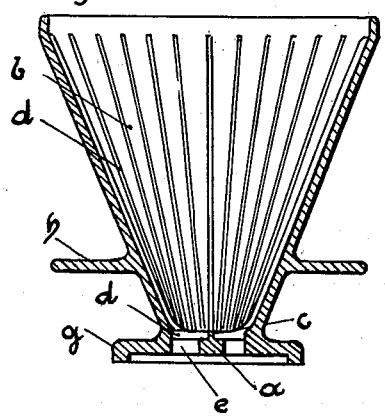
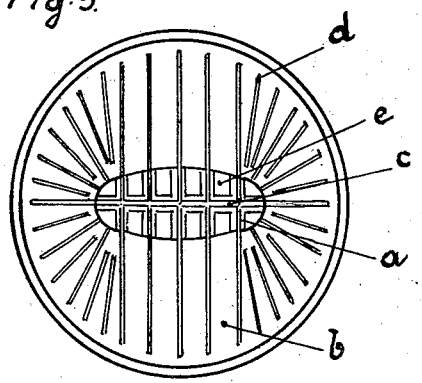
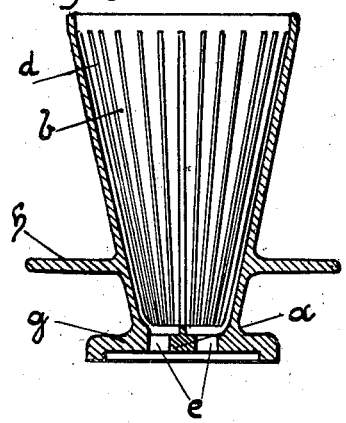
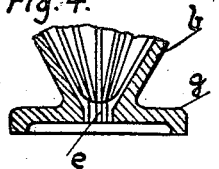
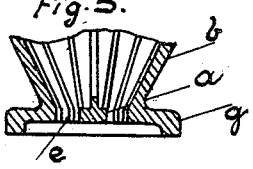
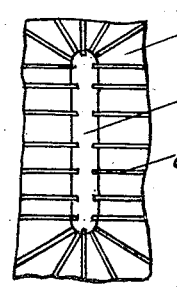
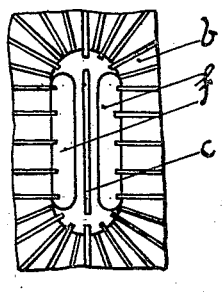
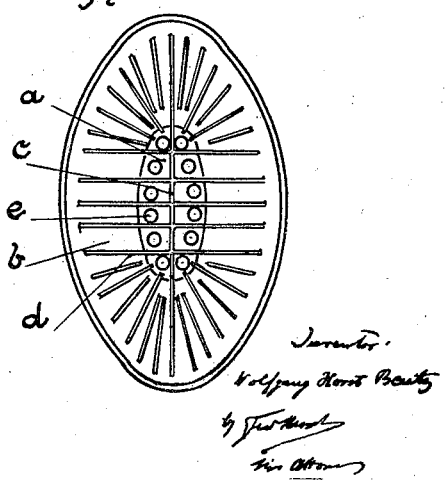

March 11, 1941.   W. H. BENTZ   2,234,397
FILTERING DEVICE FOR THE PRODUCTION OF BEVERAGES, SUCH AS TEA AND COFFEE
Filed May 20, 1937   3 Sheets-Sheet 2
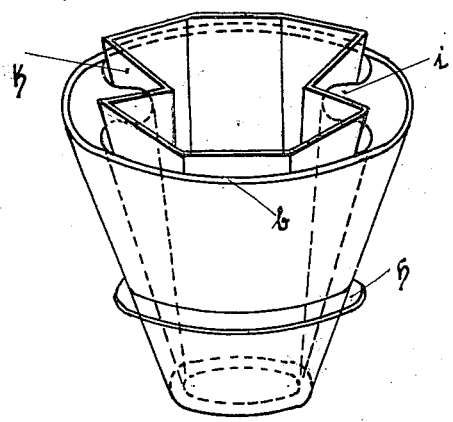
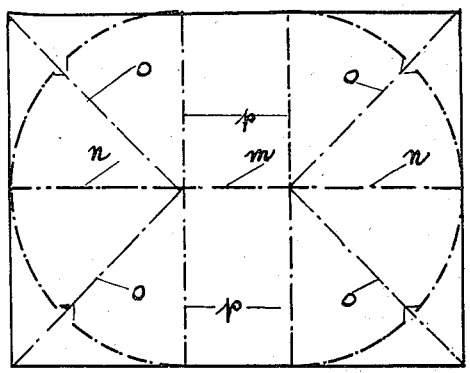
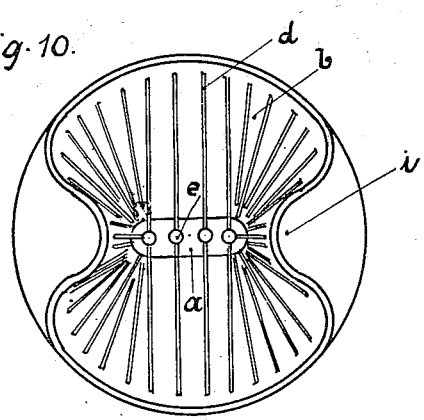
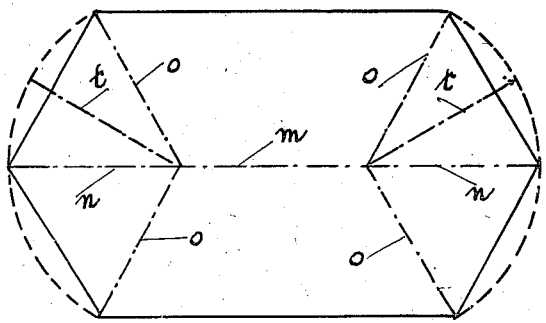
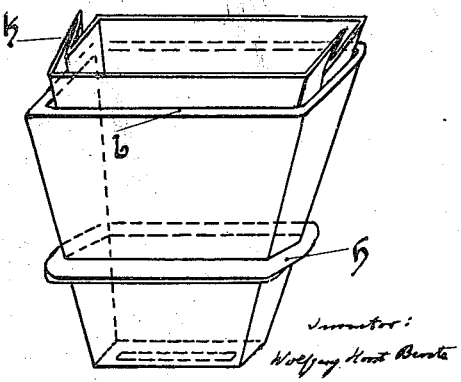

March 11, 1941.  W. H. BENTZ  2,234,397

FILTERING DEVICE FOR THE PRODUCTION OF BEVERAGES, SUCH AS TEA AND COFFEE

Filed May 20, 1937  3 Sheets-Sheet 3

Patented Mar. 11, 1941

2,234,397

UNITED STATES PATENT OFFICE 2,234,397

FILTERING DEVICE FOR THE PRODUCTION OF BEVERAGES, SUCH AS TEA AND COFFEE

Wolfgang Horst Bentz, Minden, Germany, assignor, by mesne assignments, to Melitta-Werke Bentz & Sohn, Minden, Germany Application May 20, 1937, Serial No. 143,783
In Germany June 6, 1936

2 Claims. (Cl. 210—160)

When preparing coffee and tea according to the filtering method the filtering speed plays an important part. In order to attain the greatest possible filtering speed it has been recently proposed to employ the filtering paper in the form of approximate cones which are produced from a suitably cut paper by connecting the side edges by point-stamping, the point of the screw being cut off. As in such filter papers the paper lies on almost the whole inner surface of the filtering vessel in only one layer, the filtering speed is considerably increased and paper economised.

In using such filtering papers in the commonly used filtering vessels in cup-shape or in the shape of a truncated cone, i. e. with a round flat bottom the difficulty is that the line-shaped lower edge of the filter paper and the portions of the side walls extending from both sides have to be adapted to the round, flat bottom of the filtering vessel, this being impossible without the aid of an inserting implement. But also with such implement, the filter cone cannot be accurately adapted to the filtering vessel and it happens that the papers tears at the strongly stressed points. Further, the paper in the lower part of the vessel, especially important for the filtering, will be superposed in several layers, if only over a small range.

These inconveniences are obviated by the present invention, which at the same time increases the filtering speed which could never be obtained merely by the single paper layer on the filtering surface. The invention consists in the first instance that the bottom of the filtering vessel has an oval, or at the utmost a slit-shape, the side wall extending from the bottom either in oval shape or gradually in a round, undulated or cornered shape. It is therefore possible to insert the filtering papers without any difficulty by hand into the filtering vessel and so that they apply on the whole inner surface of the filtering vessel, which has ribs.

A particularly suitable construction of the side walls is the undulated shape, i. e. a filtering vessel the side wall of which has grooves or ribs or fold-like or undulating indentations getting larger towards the upper end and corresponding with the side folds of the filtering paper formed by folding a plane paper sheet. By this construction of the side wall the effective filtering surface is considerably enlarged and it is further rendered possible to employ the paper retarding the filtration, which up to the present was accommodated in the side folds of a substantially conical member folded from a plane paper sheet.

With this object in view the folded filter paper is inserted into the filtering vessel so that the side folds coincide with the fold-like indentations of the vessel. By the side folds in combination with the indentations of the vessel the filtering speed is therefore quite considerably increased which had not been possible to present.

The problem to form by folding filtering bags in substantially conical form with cut off point, has been solved according to the invention by forming the bottom by a downwardly pressed folding line. From this bottom folding line extend at either side three or more radial embossed lines, which are alternately pressed out in upward and downward direction and form the side folds, when the filter paper is inserted into the filtering vessel. The formation of the bottom by a bottom folding line presents the special advantage that the filtering bag is flat, also in the folded state and consequently can be easily packed; it even enables the production of the filtering paper adapted to the truncated cone shape, in that around the bottom folding line as diameter a circle is pressed in, corresponding to the bottom of the filtering vessel, from which the side folds extend. By the bottom folding line also these filtering papers designed for filtering vessels in the shape of a truncated cone can be folded up and consequently easily packed.

Embodiments of the invention are shown in the copying drawings in which

Figs. 1 to 8 show different filtering vessels with oval to slit-shaped bottom,

Figs. 9 and 10 show forms of construction of filtering vessels with undulated or fold-like indentations in the side wall, Figs. 11 to 18 show, by way of example, cuts for filtering papers with lines indicated for embossing or filtering screws formed from these cuts.

Figure 13:
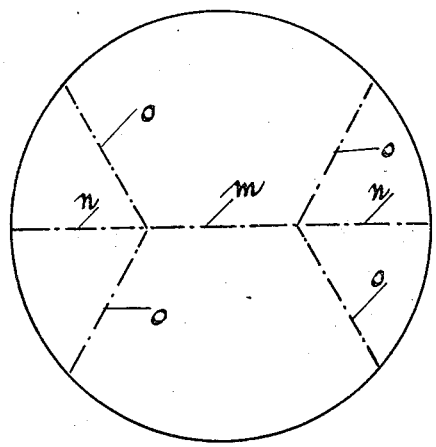

In the form of construction, shown in Figs. 1-3, the bottom *a* of the filtering vessel is oval, whereas the side wall *b* merges from the oval shape in the lower portion gradually into the circular shape of the rim. Fig. 1 shows a vertical section in the longitudinal direction of the oval bottom *a*, whereas Fig. 2 shows a vertical section across the bottom *a*. In Fig. 3 the filtering vessel is shown in top plan view.

In the bottom *a* outflow holes *e* are arranged at either side of a middle rib *c*, the side ribs *d* terminating near the holes. These outflow holes *e* may eventually be arranged at the place of the middle rib *c*, in which case they preferably have the form of a slit-like incision, up to which reach the side ribs *d* extended beyond the bottom. In this instance the bottom is slightly inclined to the slit-like incision, so that the paper can be better laid on and the filtrate can more rapidly flow out.

Fig. 4 shows a form of construction in which the bottom is slit-like. In this instance the slit *f* serves as an outflow passage, the side wall *b* extending upwardly directly from this slit. The side ribs *d* may be approximately parallel up to the slit *f*.

The side wall *b* need not raise straight, as shown in the drawing, but it may be curved more or less, in which case the filtering screws even better fit according to their shape.

When filtering papers are used which have at the lower end a bordering seam, it may happen that this seam turns over and covers the slit-like opening *f* (Fig. 4). In the form of construction, shown in Fig. 5, this is prevented by the arrangement of two slits *f* the one at the side of the other. Instead of two parallel slits also three parallel longitudinal slits *f* may be provided in the bottom, but usually two slits are sufficient.

In the form of construction, shown in Figs. 6 and 7 not only the bottom but the whole side wall up to the upper edge is oval or ellipsoidal. This presents the advantage of a greater uniformity of the arrangement and of a better adaptation to the screw shape.

In order that the vessel with the oval or slit-like bottom can be securely placed on the table, it has preferably a downwardly curved edge *g*. The vessel may further have a ring *h* extending around the side wall which facilitates placing of the filter on pots, cups and the like.

Fig. 8 shows a filtering vessel with rectangular or slit-like bottom, from which the side wall *b* raises in a correspondingly cornered shape.

In Figs. 9 and 10 a filtering vessel with filtering paper inserted is illustrated in perspective view and top plan view, the side wall *b* of which has undulated or fold-like indentations *i*. These indentations *i* which corresponding to the side walls of the filtering papers get gradually shallower in downward direction and are, according to the invention, dimensioned so that they register with the side folds *k* of the screws as shown in Fig. 9. The indentations *i* engaging in the folds of the filtering papers may be produced either by according thickening of the side wall *b* or by a curve in the uniformly thick side wall *b*. Instead of the inwardly directed indentations *i* outwardly directed bulgings may be provided.

The range of application of the undulated or fold-like side wall *b* is evidently not restricted to filtering vessels with slit-shaped or oval bottom, but may also be applied for any filtering vessel with side wall constructed for filtering.

In Figs. 11–18 the filter papers or the cut of the same suitable for the filtering vessels above described are shown. In all these filter papers formed by folding, the bottom is formed by a folding line *m* pressed in from above from which extend at either side three or more folding lines in ray-like arrangement, which are alternatively pressed in from above or from below and therefor positively form the side folds *k* when the filtering filter paper is inserted into the filtering vessel. The lateral folding lines *n* in the extension of the bottom folding line *m* are pressed in from below, the two lateral folding lines *o* are pressed in from above. It is material that always one of the folding lines forming the side folds is situated in the extension of the bottom folding line *m*, whereby it is possible to lay flat the screw folded around the bottom folding line *m*.

The folding lines *p*, shown in Fig. 12, are not absolutely necessary, they only facilitate inserting of the filter paper in the filtering vessel.

The cuts are preferably in the interest of saving paper of such a shape that the upper edge of the filter paper is flush with the upper edge of the filtering vessel. The rectangular form of the cut for the filter paper has proved most favorable for a filtering vessel with bottom of oval to rectangular shape (see Figs. 11 and 12).

Figure 14:
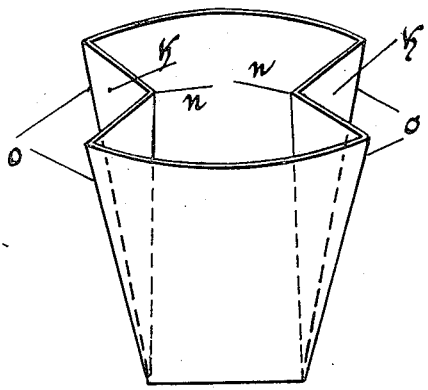
Figure 15:
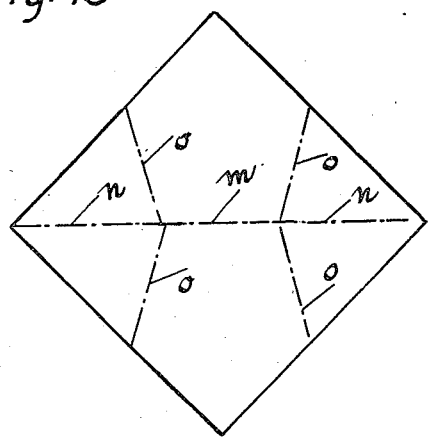
Figure 17:
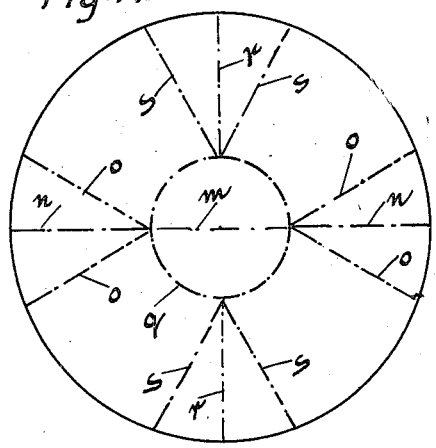
Figure 16:
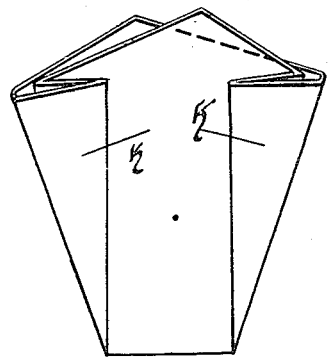

In Figs. 13 and 14 a disc-like cut is shown in Fig. 13, and the screw or bag for this cut in Fig. 14, whereas Fig. 15 shows a square cut which with a relatively small consumption of paper can well be adapted to the filtering vessel. The screw formed from the cut shown in Fig. 15 is illustrated in Fig. 16.

The bottom folding line *m* enables also the employment of such filtering screws in filtering vessels of truncated cone shape, the filter papers having then to be inserted by means of an inserting implement same as those formed of bordering. To facilitate the insertion the bottom is preliminarily embossed by a circular folding line *q* which has the bottom folding line *m* as diameter (see Fig. 17). From the circular folding line *q*, in the extension of the bottom folding line *m*, extend the folding lines *n* so that, also this filtering bag can be folded flat. From the circular folding line *q* extend further the lateral folding lines *r*, directed perpendicularly to the bottom folding line *m* and the side folding lines *n*, and the folding lines *s* corresponding to the side folding lines *o*. These filtering bags are obviously suited for filtering vessels of truncated cone shape with smooth side wall as well as for filtering vessels with undulated side wall.

Figure 18:
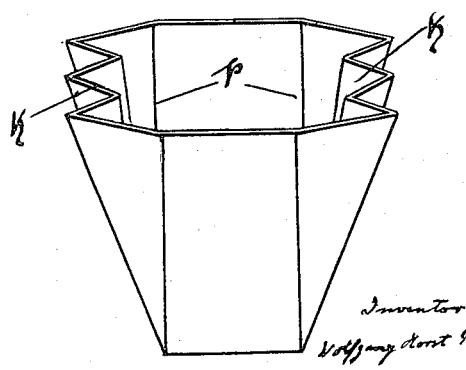

If the described filtering bags are employed for filtering vessels with smooth side wall, the filtering paper is evidently in several layers at the places of the folds *k*. To restrict the multiple layers to the smallest possible area and not to impair the filtering speed, the folds *k* may be folded several times, or each one subdivided in a number of plissé-like folds, as shown in Fig. 18. In this filtering bag the folds *k* are several times superposed, but they cover only a very small portion of the side wall *b*, so that the paper on the greatest portion of the side wall is only in one layer. If the bag provided with plissé folds *k* is brought on the market ready for use, the folds may be rendered lasting by depressions such as point-bordering or the like.

For insertion, into a filtering vessel according to Fig. 8 the lateral folding lines *o* are not absolutely necessary; in this instance it is sufficient if, besides the folding lines *n*, still another folding line *t* is provided on each side which is pressed in (Fig. 12). It is also in this instance material that the side folding lines *n* are situated in alignment of the bottom folding line *m*, so that the filter paper can be folded flat.

The numerous forms of construction in the drawings show in which manifold manner a filtering device according to the invention can be constructed. The features which bring these serious advantages are, in the vessels, the oval to slit-shaped bottom and the undulated or fold-like indentations of the side wall *b*, and in the filtering bag the bottom folding line *m* with the folding lines *n* for the side wall forming extension of the said bottom folding line.

I claim:

1. A filtering device for the production of coffee and tea beverages, comprising in combination, a filtering vessel having a narrow elongated bottom provided with at least one outflow aperture, a continuous side wall extending upwardly from said bottom and gradually widening towards its upper edge, and a filter bag inserted in said vessel, said bag having an elongated bottom portion of substantially the configuration of the narrow elongated bottom of said filtering vessel, the side walls of said filtering bag being of substantially the same shape as the side walls of the vessel.

2. A filtering device for the production of tea and coffee beverages, comprising in combination a filtering vessel having a narrow elongated bottom provided with at least one outflow aperture, a continuous side wall extending upwardly from said bottom and gradually widening towards and merging into ring formation at its upper edge, and a filtering bag inserted in said vessel, said bag having an elongated bottom portion of substantially the configuration of the narrow elongated bottom of said filtering vessel, the side walls of said filtering bag being of substantially the same shape as the side walls of the vessel.

WOLFGANG HORST BENTZ.